Feb. 10, 1959   E. J. BARRETT, JR., ET AL   2,873,210
ALKYD RESIN COMPOSITION AND METALS COATED THEREWITH
Filed Jan. 17, 1957
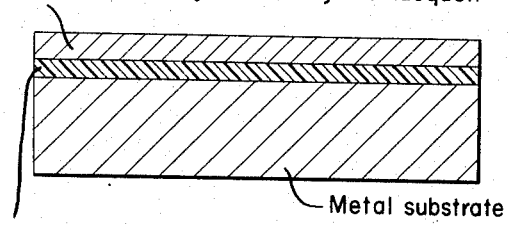
Topcoat of methyl methacrylate lacquer.
Metal substrate
Baked alkyd resin prime coat.
INVENTOR
EDWARD JOSEPH BARRETT, JR
DAVID FLITTER
BY
AGENT

United States Patent Office 2,873,210
Patented Feb. 10, 1959

2,873,210

ALKYD RESIN COMPOSITION AND METALS COATED THEREWITH

Edward Joseph Barrett, Jr., Media, and David Flitter, Havertown, Pa., assignors to E. I. du Pont de Nemours and Company, Wilmington, Del., a corporation of Delaware Application January 17, 1957, Serial No. 634,652

13 Claims. (Cl. 117—75)

This invention relates to a finishing system and more particularly to metal articles having a multilayer coating comprising an alkyd resin undercoat containing hexachloroendomethylenetetrahydrophthalic acid and a superposed topcoat of methyl methacrylate lacquer in adherent contact therewith.

Methyl methacrylate lacquers, that is coating compositions containing a solvent and as the principal film-forming constituent polymers of methyl methacrylate can be applied to substrates and dried to form films or coatings which have outstanding durability and gloss retention. Unfortunately, such coatings do not have adequate metal protecting and rust-inhibiting properties for protecting metal articles which are to be used outdoors, such as, for example, steel automobile bodies. It is, therefore, necessary to apply a protective coating to such articles before applying a topcoat of methyl methacrylate lacquer.

The undercoat which is applied before the methyl methacrylate lacquer to provide metal protection and inhibit rusting is known as a primer and the dry coat resulting from the application of such a material is commonly referred to as the primer coat or prime coat. The conventional primers such as those commonly used under alkyd resin enamels, amino-aldehyde enamels and nitrocellulose lacquers are not satisfactory as prime coats for methyl methacrylate lacquers. Methyl methacrylate topcoats applied over these conventional prime coats crack and do not adhere well. Therefore, finishing systems consisting of a conventional metal prime coat and a methyl methacrylate topcoat are not suitable for such uses, for example, as automobile finishes.

We have discovered an adherent and durable finishing system having a methyl methacrylate lacquer topcoat. In addition, we have discovered a material which can be used as a prime coat for both methyl methacrylate lacquers and other conventional topcoats such as nitrocellulose lacquers. This interchangeability of the prime coat is particularly advantageous in assembly lines where several different topcoats can now be applied to articles having the same uniform prime coat.

The finishing system of this invention comprises an undercoat and a superposed dried topcoat of methyl methacrylate lacquer in adherent contact therewith. The undercoat is a baked layer of a coating composition comprising an alkyd resin formed by the reaction of (A) a dicarboxylic acid component comprising at least about 25 mole percent of hexachloroendomethylenetetrahydrophthalic acid (B) an oil component comprising at least one of the group consisting of tall oil, semi-drying oils, drying oils and fatty acids derivable therefrom and (C) at least one polyol, the alkyd resin being characterized by having an oil length of from about 20 to 45, an acid number of less than about 50 and unreacted hydroxyl equivalent to 0.5 to 5.0 percent by weight of glycerol based on the total weight of alkyd resin.

The drawing shows an enlarged cross-sectional view of a metal article coated with the finishing system of this invention.

The alkyd resin undercoat composition is prepared by mixing the dicarboxylic acid, the oil and the polyol components in sufficient proportions to yield a resin with an oil length of from about 20 to 45 and preferably 25 to 35 and an excess hydroxyl equivalent to about from 0.5 to 5 and preferably 1 to 3% of glycerol based on the total weight of resin, then cooking the resulting mixture with or without solvent to an acid number which is less than about 50 and preferably less than 30. Oil length is a term used to describe the amount of oil in the resin and equals the percent by weight of fatty oil acid calculated as triglyceride (monocarboxylic acid-triglyceride) used in preparing the resin. As is conventional in the coating art, the excess hydroxyl and oil length are based on glycerol whether or not glycerol is used as the polyol. Acid number is the number of milligrams of potassium hydroxide necessary to neutralize the acidity of one gram of alkyd resin.

After the various constituents are defined, the oil length and excess hydroxyl specify the amount of each constituent, and the acid number is a measure of how close to completion the reaction has run and therefore how close the alkyd resin is to its gel point.

The dicarboxylic acid component of the alkyd resin contains from about 25 to 100 mole percent of hexachloroendomethylenetetrahydrophthalic acid, also known as chlorendic acid and also known by the Geneva nomenclature as bicyclo (2.2.1)-5-heptene-2,3, dicarboxylic acid, 1,4,5,6,7,7 hexachloro, which can be represented by the formula:

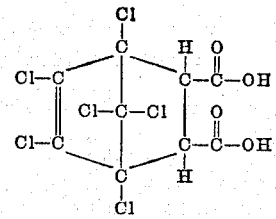

One method of preparing this compound is by a conventional Diels-Alder reaction of hexachloropentadiene with maleic acid at a temperature of from 140 to 180° C.

One hundred mole percent of hexachloroendomethylenetetrahydrophthalic acid can be used as the dicarboxylic acid component, but when the primer is to be used with top coats other than those of methyl methacrylate lacquers such as, for example, with nitrocellulose lacquers, it is advantageous to have up to 75 mole percent and preferably 40 to 60 mole percent of at least one unsubstituted benzene or acyclic dicarboxylic acid such as, for example, phthalic acid, terephthalic acid, isophthalic acid, adipic acid, sebacic acid, azelaic acid or mixtures thereof in the dicarboxylic acid component. At least one unsubstituted dicarboxylic acid is necessary in order to give the dried prime coat good nitrocellulose lacquer adhesion, yet, the dicarboxylic acid component of the prime coat must contain at least 25 mole percent of hexachloroendomethylenetetrahydrophthalic acid in order to adhere to methyl methacrylate lacquers. Mixing an alkyd resin containing the chlorinated acid with another resin containing at least one unsubstituted dicarboxylic acid does not give this dual adhesion. The unsubstituted dicarboxylic acid and the hexachloroendomethylenetetrahydrophthalic acid must be incorporated in the same alkyd resin chain. The aforementioned prime coat containing an alkyd resin formed from both an unsubstituted dicarboxylic acid and hexachloroendomethylenetetrahydrophthalic acid makes it possible to shift from nitrocellulose to methyl mathacrylate lacquer topcoats in automotive assembly lines without having to use a different prime coat.

The anhydrides of hexachloroendomethylenetetrahydrophthalic acid or any of the aforementioned unsubstituted dicarboxylic acids can be used in equivalent amounts in place of the acid. The term dicarboxylic acid as used herein embraces this obvious equivalent.

The second component of the alkyd resin primer is one or more of the group consisting of tall oil, semidrying oils, drying oils and fatty acids derivable therefrom. These materials, which contain a mixture of saturated and unsaturated monocarboxylic acids, or esters thereof, thicken on exposure to light and air. Tall oil is a complex mixture of organic materials containing principally fatty acids and rosin acids and is derived from the waste liquor of sulfate paper manufacture. Semidrying oils include, for example, soybean oil, menhaden oil and cod-liver oil. Drying oils include, for example, dehydrated castor oil, tung oil, oiticica oil, linseed oil, and perilla oil. Typical fatty acids which are present in the aforementioned materials either as free acids or as esters thereof (mainly glycerides) include, for example, linoleic, palmitolic, oleic and linolenic acids.

Drying oils should not be used alone where parts are to be dip coated since they oxidize and body in dip tanks. Non-drying oils such as, for example, coconut oil, palm oil, castor oil and olive oil cannot be used as the sole constituent of the oil component since primers made therefrom do not form hard, durable coatings.

The third component of the alkyd resin is a polyol such as, for example, glycerol, pentaerythritol, mannitol, sorbitol, ethylene glycol, trimethylolethane, trimethylolpropane, cyclohexanediol and mixtures thereof. The preferred polyol is glycerol or a mixture of the aforementioned polyols having an average of at least 3 hydroxyl groups per molecule.

The complex alkyd resin used in this invention is prepared by standard methods. The aforementioned components are added to a stirred autoclave, an open varnish kettle or other conventional reaction vessel, then the mixture is heated with or without a solvent at less than 200° C. and preferably from 160 to 190° C. until an acid number of less than 50 and preferably less than 30 is reached. Solvents can be added during or after the reaction to facilitate handling. Solvents for the resin include any of a wide variety of aliphatic, cycloaliphatic and aromatic hydrocarbons, alcohols, ketones, ethers and esters such as, for example, xylene, toluene, benzene, decane, high solvency naphtha, cyclohexane, butyl acetate, methyl isobutyl ketone, and butyl ether. If desired, esterification catalysts such as, for example, litharge, lime, or toluene sulfonic acid can also be added to the reaction mixture.

Pigments such as, for example, metal oxides, hydroxides, chromates, silicates, sulfides, sulfates, and carbonates, carbon blacks, organic dyestuffs and lakes thereof, and metal flake pigments are usually added to the primer in proportions normally used in undercoat compositions. Conventional modifiers for coating compositions such as inhibitors, dispersing agents, flow control agents and the like can also be added.

The finished primer is applied to the substrate to be coated by any of the standard fluid coating techniques such as flow, dip, spray, brush or roller coating, and baked at about from 150 to 200° C. and preferably from 175 to 195° C. for about 60 to 15 minutes and preferably 35 to 25 minutes.

The methyl methacrylate lacquers are applied over the prime coat and dried to complete the finishing system.

The polymers of methyl methacrylate useful in making the methyl methacrylate lacquers employed in preparing the products of the invention are either homopolymers of methyl methacrylate or copolymers of methyl methacrylate with minor amounts, for example, in order of 2 to 25% by weight, of another material copolymerizable therewith, such as, for example, acrylic acid, methacrylic acid, the 1 to 4 carbon alkyl (i. e., methyl to butyl) esters of acrylic acid, the 2 to 4 carbon alkyl (i. e., ethyl, propyl and butyl) esters of methacrylic acid, vinyl acetate, acrylonitrile and styrene. A preferred copolymer contains about 98% of methyl methacrylate and 2% methacrylic acid. The term "polymer of methyl methacrylate" and related terms, as used herein, refer to both homopolymers of methyl methacrylate and copolymers thereof as well as mixtures of homopolymers, mixtures of copolymers, and mixtures containing both homopolymers and copolymers.

The preferred methyl methacrylate polymers have a relative viscosity of about 1.117 to 1.196. Methyl methacrylate topcoat lacquers based on such polymers are disclosed and claimed in copending application Serial No. 434,661, filed June 4, 1954, by Laverne W. Crissey and John H. Lowell. Still other methyl methacrylate topcoat lacquers containing such polymers which are particularly useful for spray application are disclosed and claimed in copending application Serial No. 402,498, filed January 6, 1954, by Laverne W. Crissey and John H. Lowell.

The term "relative viscosity," as used herein to specify a property of polymers of methyl methacrylate, is the value obtained by dividing the efflux time of a solution, A, of the polymer of methyl methacrylate by the efflux time of the solvent, B, used in the solution, the efflux times being measured in accordance with the procedure of A. S. T. M. D–445, 46T, Method B. Polymer solution A is a solution of 0.25 gram of the polymer of methyl methacrylate being tested in 50 cc. of ethylene dichloride, and the solvent B is ethylene dichloride. The efflux times are determined at 25° C. in a standard apparatus currently marketed under the designation of Modified Ostwald Viscosimeter, Series 50.

The polymers of methyl methacrylate used in making the methyl methacrylate lacquers can be prepared according to well known methods by polymerizing methyl methacrylate monomer with or without another monomer copolymerizable therewith either in bulk, in solution, or in granular form to produce products having the required relative viscosity.

Pigments, solvents and modifiers similar to those used in the primer can be added to the methyl methacrylate lacquer. Plasticizers such as, for example, benzyl butyl phthalate, dibutyl phthalate, triphenyl phosphate, 2-ethyl hexyl benzyl phthalate and dicyclohexyl phthalate are preferably added to the lacquer. The methyl methacrylate lacquers can be dried at room temperature or at an elevated temperature, which is usually less than that used for the prime coat.

Preferably the finishing system of this invention is applied directly to a metal substrate; however, a conventional prime coat can be applied to the substrate followed by the primer of this invention and the methyl methacrylate lacquer. The important requirement is that the methyl methacrylate lacquer be in adherent contact with the alkyd resin prime coat of this invention.

The finishing system of this invention makes it possible to firmly adhere durable, glossy methyl methacrylate topcoats to metal articles. In addition, this finishing system protects metal articles and inhibits rusting. These properties make the finishing systems of this invention particularly useful on steel automobile bodies.

The novel undercoat composition containing an alkyd resin having a dicarboxylic acid component consisting of hexachloroendomethylenetetrahydrophthalic acid and at least one unsubstituted dicarboxylic acid is particularly useful in automobile finishing because it will adhere to both nitrocellulose and methyl methacrylate lacquers; thus, a different primer does not have to be used for each topcoat.

The following examples are intended to illustrate the invention and not to limit it in any way. Parts are by weight unless otherwise specified:

EXAMPLE I

Preparation of the alkyd resin

The following materials were charged to a resin kettle equipped with a reflux condenser and stirrer and blanketed with carbon dioxide.

| | Parts by weight |
|---|---|
| Hexachloroendomethylenetetrahydrophthalic acid | 626 |
| Phthalic anhydride | 283 |
| Refined tall oil | 431 |
| Glycerol | 300 |
| Castor oil | 72 |
| | 1712 |

The tall oil and part of the glycerol were first heated to about 155° C., then the remaining constituents were added. Fifty parts of a solvent consisting of mineral spirits and toluene in a 5:1 weight ratio were added to the reaction mixture. Heating was continued until the reaction reached 190° C., then 50 more parts of solvent were added. The reaction was continued for 8 hours at 190° C. to yield a resin having an acid number of 21.5.

The resulting resin was next diluted with high boiling naphtha solvent ("Panasol" AN1—Pan American Solvent Co.) to yield a solution having the following properties:

| | |
|---|---|
| Viscosity, Gardner-Holdt | Z—6+1/4 |
| Acid number | 21.5 |
| Unreacted hydroxyl, wt. percent glycerol | 2.3 |
| Oil length | 33 |
| Solids, wt. percent | 54.5 |

Preparation of liquid undercoat composition

Pigment and the alkyd resin shown above were ground together on a conventional paint mill to yield a smooth dispersion, then solvent, more resin and a baking agent were added to yield a primer having the following composition:

| | Parts by weight |
|---|---|
| Alkyd resin composition produced above | 100.7 |
| Toluol | 126.3 |
| High-boiling naphtha solvent—"Panasol" AN1 (Pan American Solvent Co.) | 18.9 |
| Calcium carbonate whiting | 38.9 |
| Zinc chromate | 2.4 |
| Carbon black | 4.2 |
| Phenyl-alpha-naphthylamine (15 weight percent solution) | 1.4 |
| Copper naphthanate (70 weight percent solution) | 2.2 |
| | 295.0 |

Preparation of topcoat composition

A methyl methacrylate lacquer was prepared by mixing the following ingredients and grinding them in a conventional paint mill until a smooth uniform dispersion was obtained.

| | Parts by weight |
|---|---|
| Homopolymer of methyl methacrylate | 67 |
| Benzyl butyl phthalate | 28 |
| Fatty amine treated montmorillonite clay | 5 |
| Titanium dioxide | 30 |
| Phthalocyanine blue | 5 |
| Toluol | 65 |
| Xylol | 65 |
| | 265 |

The homopolymer of methyl methacrylate used in this lacquer had a relative viscosity of about 1.142 as determined by the method described on page 9.

Preparation of coated articles

A coat of the liquid undercoat described above was sprayed onto each of two panels which had been treated with a conventional rust inhibitor ("Bonderite," a product of Parker Rust-Proof Co.). The coated panels were baked at 177° C. for 30 minutes. The resulting baked undercoat was approximately 1 mil thick.

Next, a coat of the methyl methacrylate lacquer described above was sprayed onto the dried undercoat on one of the panels and dried 20 minutes at 93° C. The baked topcoat was approximately 2 mils thick.

A standard pigmented nitrocellulose lacquer having a binder containing about 10 parts of nitrocellulose, 9 parts of non-drying glycerol phthalate alkyd resin and 2.5 parts of a plasticizer consisting of dibutyl phthalate and castor oil was sprayed onto the second coated panel and dried.

Evaluation of the coated articles

Each panel was tested for adhesion of the primer to the metal and adhesion of the topcoat to the primer by cutting two two-inch long marks in the form of an X vertically through the coating down to the metal, securely pressing a strip of pressure-sensitive cellophane adhesive tape over the X, then pulling the adhesive tape off with a jerk. Neither the nitrocellulose lacquer nor the methyl methacrylate lacquer was stripped from the undercoat nor was the undercoat stripped from the metal in the tape-jerk test. When the tape-jerk-test is performed on steel panels having a finishing system consisting of a topcoat of methylmethacrylate lacquer and an undercoat of conventional steel primer, the topcoat is stripped easily from the undercoat.

The methyl methacrylate lacquer-alkyd resin finishing system also showed excellent corrosion resistance (salt spray), excellent cold-crack resistance, and excellent resistance to blistering after prolonged immersion in water.

Example II

An alkyd resin was prepared by heating the following materials at 185 to 190° C. for 4 hours:

| | Parts by weight |
|---|---|
| Hexachloroendomethylenetetrahydrophthalic acid | 626 |
| Adipic acid | 279 |
| Refined tall oil | 431 |
| Glycerol | 301 |
| Solvent (5 parts mineral spirits:1 part toluol) | 50 |
| | 1687 |

The resulting resin after being thinned to 50% solids had the following properties:

| | |
|---|---|
| Viscosity, Gardner-Holdt | Z—4+¼ |
| Acid number | 50 |
| Unreacted hydroxyl, wt. percent glycerol | 2.7 |
| Oil length | 30 |

This alkyd resin was formulated into an undercoat composition and applied to a metal panel by the method described in Example I, then topcoated with the methyl methacrylate lacquer shown in that example. The resulting finishing systems had properties comparable to those shown in Example I.

Example III

An alkyd resin was prepared by heating the following materials at 185 to 190° C. for 5½ hours:

| | Parts by weight |
|---|---|
| Hexachloroendomethylenetetrahydrophthalic acid | 620 |
| Phthalic anhydride | 141 |
| Adipic acid | 140 |
| Refined tall oil | 431 |
| Glycerol | 311 |
| Toluol | 45 |
| | 1688 |

After being diluted to 50% solids, the resulting resin had the following properties:

| | |
|---|---|
| Viscosity, Gardner-Holdt | Z—3+½ |
| Acid number | 25 |
| Unreacted hydroxyl, wt. percent glycerol | 3.4 |
| Oil length | 30 |

This alkyd resin was formulated into an undercoat composition and applied to a metal panel according to the method of Example I, then topcoated with the methyl methacrylate lacquer of that example. The resulting finishing system had the same excellent properties as the systems shown in the preceding examples.

EXAMPLE IV

An alkyd resin was prepared by heating the following materials at 185 to 190° C. for 5 hours:

| | Parts by weight |
|---|---|
| Hexachloroendomethylenetetrahydrophthalic acid | 620 |
| Adipic acid | 280 |
| Refined tall oil | 431 |
| Glycerol | 236 |
| Ethylene glycol | 75 |
| Toluol | 79 |
| | 1721 |

A 50% solution of the resulting alkyd resin had the following properties:

| | |
|---|---|
| Acid number | 19 |
| Viscosity, Gardner-Holdt | U |
| Unreacted hydroxyl, wt. precent glycerol | 4 |

After the alkyd resin described above had been formulated into a primer, applied to a metal panel and dried by the method shown in Example I, a topcoat of the methyl methacrylate lacquer described in that example was applied to the prime coat and dried. The resulting finishing system had excellent properties similar to those in the preceding examples.

EXAMPLE V

An alkyd resin was prepared by heating the following materials at about 177° C. for 12 hours under a carbon dioxide blanket:

| | Parts by weight |
|---|---|
| Hexachloroendomethylenetetrahydrophthalic acid | 1277 |
| Phthalic anhydride | 566 |
| Refined tall oil | 862 |
| Glycerol | 601 |
| Xylol | 350 |
| | 3656 |

After being thinned to 55% solids, the resulting resin had the following properties:

| | |
|---|---|
| Viscosity, Gardner-Holdt | R+¼ |
| Acid number | 28 |
| Unreacted hydroxyl, wt. percent glycerol | 2.4 |
| Oil length | 30 |

The alkyd resin was next pigmented and applied to a metal panel as described in Example I, then top-coated with the methyl methacrylate lacquer shown in that example. The resulting finishing system had excellent properties similar to those of the preceding examples.

EXAMPLE VI

An alkyd resin was prepared by heating the following materials at 190° C. for about 12 hours:

| | Parts by weight |
|---|---|
| Hexachloroendomethylenetetrahydrophthalic acid | 2132 |
| Dehydrated castor oil | 833 |
| Glycerol | 330 |
| Pentaerythritol | 126 |
| Xylol | 325 |
| | 3746 |

The resulting resin had an oil length of 26, an acid number of 12 and unreacted hydroxyl calculated as percent by weight of glycerol of 3.4%. A 55% solution of the resin in xylol had a Gardner-Holdt viscosity of T+¾.

The alkyd resin was next ground with pigment to give a smooth dispersion, then mixed with more resin and additives to yield an undercoat having the following composition:

| | Parts by weight |
|---|---|
| Alkyd resin described above (55% solution in xylol) | 38.3 |
| Barytes | 54.3 |
| Iron oxide (Fe$_2$O$_3$) | 13.9 |
| Zinc oxide | 1.8 |
| Calcium silicate-wollastonite | 5.0 |
| Cresol | 0.1 |
| Soya lecithin | 0.7 |
| Lithographing oil | 1.0 |
| Xylol | 7.0 |
| High solvency petroleum naphtha | 16.0 |
| | 138.1 |

One hundred parts of this undercoat were thinned with 8 parts of mineral spirits (boiling range about 145–215° C.) and sprayed onto steel panels, then dried for 60 minutes at 143° C.

A methyl methacrylate lacquer similar to that shown in Example I was sprayed onto the prime coated panels, then dried. The resulting methyl methacrylate-alkyd resin finishing system had the same excellent properties as those shown in the previous examples. Standard nitrocellulose base lacquer, however, does not stick well to the undercoat composition shown in this example.

EXAMPLE VII

An alkyd resin was prepared by heating the following materials at 199° C. for 30 hours:

| | Parts by weight |
|---|---|
| Hexachloroendomethylenetetrahydrophthalic acid | 950 |
| Phthalic acid | 502 |
| Refined tall oil | 1150 |
| Glycerol | 581 |
| Pentaerythritol | 37 |
| Xylol | 370 |
| | 3590 |

The resulting resin had an oil length of 40, and acid number of 3.7 and unreacted hydroxyl calculated as percent by weight of glycerol of 4. A 60% solution of the resin in xylol had a viscosity of U+⅓.

This alkyd resin was formulated into an undercoat, sprayed and dried as described in Example I. The resulting product provided good adhesion of both nitrocellulose and methyl methacrylate lacquers applied thereover.

We claim:

1. A metal article having a multi-layer coating comprising an undercoat and superposed dried topcoat of methyl methacrylate lacquer in adherent contact therewith, said undercoat comprising a baked layer of a coating composition comprising an alkyd resin formed by the reaction of (A) a dicarboxylic acid component comprising at least about 25 mole percent of hexachloroendomethylenetetrahydrophthalic acid (B) at least one of the group consisting of tall oil, semi-drying oils, drying oils and fatty acids derivable therefrom and (C) at least one polyol, said alkyd resin being characterized by having an oil length of about from 20 to 45, an acid number of less than about 50 and unreacted hydroxyl equivalent to about from 0.5 to 5.0 percent by weight of glycerol based on the total weight of alkyd resin.

2. A metal article having a multi-layer coating comprising an undercoat and a superposed dried topcoat of methyl methacrylate lacquer in adherent contact therewith, said undercoat comprising a baked layer of a coating composition comprising an alkyd resin formed by the reaction of (A) a dicarboxylic acid component comprising at least about 25 mole percent of hexachloroendomethylenetetrahydrophthalic acid, (B) at least one of the group consisting of tall oil, semi-drying oils, drying oils and fatty acids derivable therefrom and (C) at least one polyol, said alkyd resin being characterized by having an oil length of about from 25 to 35, an acid number of less than about 30 and unreacted hydroxyl equivalent to about from 1 to 3 percent by weight of glycerol based on the total weight of alkyd resin.

3. The article of claim 2 wherein said dicarboxylic acid component of said alkyd resin consists of at least one unsubstituted dicarboxylic acid and about from 40 to 60 mole percent of hexachloroendomethylenetetrahydrophthalic acid.

4. The article of claim 2 wherein said dicarboxylic acid component consists entirely of hexachloroendomethylenetetrahydrophthalic acid.

5. The article of claim 2 wherein said oil component of said alkyd resin contains tall oil.

6. The article of claim 2 wherein said polyol component of said alkyd resin contains glycerol.

7. The article of claim 2 wherein the methyl methacrylate component of said methyl methacrylate lacquer has a relative viscosity of 1.117 to 1.196.

8. A liquid coating composition comprising pigment, solvent and as the principal organic film-forming material an alkyd resin formed by the reaction of (A) a dicarboxylic acid component consisting of at least one unsubstituted dicarboxylic acid and about 40 to 60 mole percent of hexachloroendomethylenetetrahydrophthalic acid (B) at least one of the group consisting of tall oil, semi-drying oils, drying oils and fatty acids derivable therefrom and (C) at least one polyol, said alkyd resin being characterized by having an oil length of about from 20 to 45, an acid number of less than about 50 and unreacted hydroxyl equivalent to about from 0.5 to 5.0 percent by weight of glycerol based on the total weight of resin.

9. A liquid coating composition comprising pigment, solvent and as the principal film forming material an alkyd resin formed by the reaction of (A) a dicarboxylic acid component consisting of at least one unsubstituted dicarboxylic acid and about from 40 to 60 mole percent of hexachloroendomethylenetetrahydrophthalic acid (B) at least one of the group consisting of tall oil, semi-drying oils, drying oils and fatty acids derivable therefrom and (C) at least one polyol, said alkyd resin being characterized by having an oil length of about from 25 to 35, an acid number of less than about 30 and unreacted hydroxyl equivalent to about from 1 to 3 percent by weight of glycerol based on the total weight of alkyd resin.

10. The composition of claim 9 wherein said dicarboxylic acid component of said alkyd resin consists of phthalic acid and about from 40 to 60 mole percent of hexachloroendomethylenetetrahydrophthalic acid.

11. The composition of claim 9 wherein said dicarboxylic acid component of said alkyd resin consists of adipic acid and about from 40 to 60 mole percent of hexachloroendomethylenetetrahydrophthalic acid.

12. The composition of claim 9 wherein said oil component of said alkyd resin contains tall oil.

13. The composition of claim 9 wherein said polyol component of said alkyd resin contains glycerol.

References Cited in the file of this patent

UNITED STATES PATENTS

| | | |
|---|---|---|
| 2,655,487 | Keyl et al. | Oct. 13, 1953 |
| 2,779,769 | Robitschek et al. | Jan. 19, 1957 |
| 2,782,131 | Johnson | Feb. 19, 1957 |

OTHER REFERENCES

Rohm and Haas, Acryloid and Rhoplex, 1953, page 8 relied on. Copy in Div. 50.

Bjorksten Research Laboratories, Polyesters and Their Applications, Reinhold, New York, 1956.